United States Patent [19]

Lester et al.

[11] 4,329,260

[45] May 11, 1982

[54] INTEGRAL SHAPED REPLICATION SUPPORTS

[75] Inventors: George R. Lester, Park Ridge; Lawrence B. Welsh, Evanston, both of Ill.

[73] Assignee: UOP Inc., Des Plaines, Ill.

[21] Appl. No.: 214,356

[22] Filed: Dec. 8, 1980

Related U.S. Application Data

[63] Continuation-in-part of Ser. No. 78,341, Sep. 24, 1979, abandoned.

[51] Int. Cl.$^3$ .................. B01J 21/18; B01J 23/40
[52] U.S. Cl. ................... 252/446; 252/444; 252/447; 252/461; 252/463; 252/477 R
[58] Field of Search ........... 252/444, 447, 477 R, 252/446, 463, 461

[56] References Cited

U.S. PATENT DOCUMENTS

| | | | |
|---|---|---|---|
| 2,409,494 | 10/1946 | Keating | 252/430 |
| 3,162,607 | 12/1964 | Burbilge et al. | 252/477 R |
| 3,446,865 | 5/1969 | Roth et al. | 252/447 |
| 3,898,321 | 8/1975 | Marsh | 252/461 |
| 3,964,933 | 6/1976 | Fung et al. | 136/121 |
| 4,061,596 | 12/1977 | Matsushita et al. | 252/461 |
| 4,090,978 | 5/1978 | Welsh et al. | 252/447 |
| 4,113,660 | 9/1978 | Abe et al. | 252/461 |

*Primary Examiner*—John F. Niebling
*Attorney, Agent, or Firm*—James R. Hoatson, Jr.; Raymond H. Nelson; William H. Page, II

[57] ABSTRACT

Integral shaped replication composites which may be useful for supports for catalysts or as adsorbents comprise a carbonaceous pyropolymeric structure which has been prepared by treating an inorganic support with an organic pyropolymer precursor and pyrolyzing the precursor to form a carbonaceous pyropolymer possessing recurring units containing at least carbon and hydrogen atoms on the surface of the support. This carbonaceous pyropolymer will duplicate the physical shape and dimensions of the inorganic support as well as a substantial portion of the pore structure thereof. The integral shaped replication will possess an ABD which is about 25% to 100% of the ABD of the inorganic support, and have a crush strength of from about 0.5 to about 14 kilograms. The composite comprising the carbonaceous pyropolymer on the surface of the support may then be leached with an acid or base to remove the inorganic support, thus leaving a shaped replication of particle aggregates. If so desired, the shaped replication may be further treated by depositing at least one inorganic oxide on each surface of the replication.

29 Claims, No Drawings

INTEGRAL SHAPED REPLICATION SUPPORTS

CROSS-REFERENCE TO RELATED APPLICATION

This application is a continuation-in-part of our copending application, Ser. No. 78,341 filed Sept. 24, 1979, abandoned, all teachings of which are incorporated herein by reference thereto.

BACKGROUND OF INVENTION

In many instances, it is preferred to utilize various supports upon which catalytically active metals are deposited to form catalytic compositions of matter which are useful in catalyzing various chemical reactions. Usually it is preferred to employ supports which possess a relatively high surface area whereby a greater amount of catalytically active metal may be deposited on the surface. One such support which has been employed in the past comprises a refractory inorganic oxide such as alumina, and specifically gamma-alumina, which possesses the aforesaid high surface area. Other forms of alumina which also have been employed will include eta- and theta-alumina, these inorganic oxides also possessing relatively high surface areas which may range from about 10 to about 500 $m^2/g$. In addition to this type of catalyst support, it is also known from U.S. Pat. No. 4,090,978 that electrocatalysts may be used in the preparation of electrodes for an electrochemical fuel cell. The support for an electrochemical catalyst employed in this patent uses a carbonaceous pyropolymer powder or particle upon which is impregnated a catalytic metal. However, as stated, the support is in particle form which is in contradistinction to the supports of the present invention which are shaped, that is, said supports possess a definite shape such as a sphere, plate, fiber, monolith, etc. The catalytic particles are blended with Teflon powder, a binding material, and thereafter a sheet containing the catalyst is formed by a calendering or rolling operation following which the alumina is then catalytically leached from the electrode sheet. However, the formation of the sheet requires a Teflon binder and is not a replication of any starting shape, but is formed by a calendering operation. The electrocatalyst powder of this patent, after being combined with a binder, is shaped into the desired form by means of a mold press or by any other technique possessing extremely different properties than those which are possessed by the integral shaped replications of the present invention. For example, the pore structure as measured by nitrogen adsorption or desorption, or by mercury intrusion would be very different, inasmuch as it would be changed by the presence of a binder material and by the loss of that pore structure which results from individual particles being physically bonded together. Other differences between the particles of the patent and the integral shaped replications of the present invention would be in chemical properties, electrical properties, terminal properties and mechanical properties. The chemical properties of the two composites would differ substantially, inasmuch as the presence of the binders would modify the chemical properties of the powder; the terminal properties would differ in that by using a binder with the powder, the use of a support would be limited to reactions occurring at temperatures well below 300° C. as opposed to the integral shaped replications which would be stable at temperatures in excess of 500° C. in non-oxidizing environments, or in crush strength in which the crush strength of the integral shaped replications is determined by the nature of the carbonaceous pyropolymer as opposed to the composite requiring a binder to hold its shape, the crush strength of such a material as being primarily determined by the crush strength of the binder material. While the patent demonstrates that micron size pyropolymer particles can be prepared from individual alumina particles which are made up of individual alumina crystalites which are strongly and chemically bonded together, the formation of relatively large spheres, plates, rods etc. which are made up of aggregates of such particles could be successfully leached after deposition of a carbonaceous pyropolymeric coating comprising recurring units containing at least carbon and hydrogen atoms to yield a macroscopic integral shaped replication of the original inorganic shaped structure.

In addition, U.S. Pat. No. 3,964,933 describes carbon particles which may be used for electrodes and a method for the manufacture thereof. However, the composition comprises a non-conductive oxide having a deposit of carbon, and not a carbonaceous pyropolymer, on the surface. The amount of carbon deposited on the surface of the oxide may be altered by extracting or leaching a portion of the oxide to provide a material which contains from 50% to about 90% carbon, the remainder of the material consisting of the oxide. As will hereinafter be shown in greater detail, this is in contradistinction to the composition of the present invention.

DETAILED DESCRIPTION OF THE INVENTION

This invention relates to novel supports comprising integral shaped replications such as a shaped replication of particle aggregates.

More specifically, the invention is concerned with novel materials which may be used as supports for chemically active metals, as molecular sieves, or as adsorbents which may be themselves utilized in a fixed bed adsorption process.

The use of various supports for catalytically active metals constitutes an important variation by which the reactions of various catalysts can be modified or improved. As hereinbefore set forth, in many instances the surface area of the support upon which the catalytically active metal is deposited is important, a relatively large surface area being a desirable characteristic of the support. The catalytically active composites are useful in a wide variety of chemical reactions and have been used in reforming reactions, hydrocracking reactions, etc. It is contemplated within the scope of this invention that the supports which constitute novel structures of materials and which are prepared according to the processes hereinafter set forth in greater detail may be used as a catalyst base such as a support for phosphoric acid to form solid phosphoric acid and thus be used in polymerization reactions, as a catalyst support for ammonia synthesis, as a support for a metal phthalocyanine complex which would form a catalyst useful for the sweetening of petroleum products such as gasoline, as a support for an immobilized enzyme system, etc. The shaped replications which are prepared according to the process of this invention may be in any form such as those hereinbefore set forth in greater detail, said shapes possessing the desirable characteristics of surface area, pore volumes, apparent bulk density (ABD), crushing strength, etc., said integral shaped replications thereby being useful in fixed bed adsorption processes without undergoing physical deterioration to form powders, dust, fines, etc. and thus limit the use of such a composite.

It is therefore an object of this invention to provide novel structural materials which are useful in the chemical industry.

A further object of this invention is to provide a process for preparing novel structural materials.

In one aspect, an embodiment of this invention resides in a method for the preparation of an integral shaped replication of a shaped, porous and dissolvable substrate material which possesses physical dimensions, shape and an ABD suitable for use as an adsorbent in a fixed bed adsorption process, said replication duplicating the physical shape and dimensions of said substrate material and a substantial portion of the pore structure thereof, which replication consists essentially of a carbonaceous pyropolymer possessing recurring units containing at least carbon and hydrogen atoms and which replication has an ABD which is about 25% to about 100% of the ABD of said substrate material, which comprises the steps of:

(a) treating said substrate material with an organic pyrolyzable precursor compound in a reducing atmosphere at a temperature in the range of from about 500° to about 1200° C. to pyrolyze said organic compound to form said carbonaceous pyropolymer possessing recurring units containing at least carbon and hydrogen atoms in the pore structure of said substrate material, (b) continuing the treatment of step (a) until the total accumulation of said carbonaceous pyropolymer in the pore structure of said substrate is sufficient to result in a replication which possesses a crush strength of from about 0.5 to about 14 kg, and (c) recovering the integral shaped replication comprising a carbonaceous pyropolymer possessing recurring units containing at least carbon and hydrogen atoms by leaching said substrate material from the product of step (b) by contacting said product with a dissolving agent for said substrate material under conditions selected to dissolve substantially all of said substrate material.

Another embodiment of this invention is found in an integral shaped replication which has been formed according to the method set forth in the above paragraph.

Still another embodiment of this invention is found in a method for the preparation of an integral shaped replication of a shaped, porous and dissolvable substrate material which possesses physical dimensions, shape and an ABD suitable for use as an adsorbent in a fixed bed adsorption process, said replication duplicating the physical shape and dimensions of said substrate material and a substantial portion of the pore structure thereof, which replication consists essentially of a carbonaceous pyropolymer possessing recurring units containing at least carbon and hydrogen atoms and which replication has an ABD which is about 25% to about 100% of the ABD of said substrate material, which comprises the steps of:

(a) treating said substrate material with an organic pyrolyzable precursor compound in a reducing atmosphere at a temperature in the range of from about 500° to about 1200° C. to pyrolyze said organic compound to form said carbonaceous pyropolymer possessing recurring units containing at least carbon and hydrogen atoms in the pore structure of said substrate material;

(b) continuing the treatment of step (a) until the total accumulation of said carbonaceous pyropolymer in the pore structure of said substrate is sufficient to result in a replication which possesses a crush strength of from about 0.5 to about 14 kg;

(c) recovering the integral shaped replication comprising a carbonaceous pyropolymer possessing recurring units containing at least carbon and hydrogen atoms by leaching said substrate material from the product of step (b) by contacting said product with a dissolving agent for said substrate material under conditions selected to dissolve substantially all of said substrate material;

(d) depositing at least one refractory oxide on each surface of said integral shaped replication comprising a carbonaceous pyropolymer possessing recurring units containing at least carbon and hydrogen atoms;

(e) removing said carbonaceous pyropolymer possessing recurring units by oxidation; and (f) recovering resultant refractory oxide shaped replication.

A specific embodiment of this invention resides in a method for the preparation of an integral shaped replication of an alumina which possesses physical dimension, shape and an ABD suitable for use as an adsorbent in a fixed bed adsorption process which comprises treating said alumina with benzene in a reducing atmosphere at a temperature in the range of from about 400° to about 1200° C. to pyrolyze said benzene to form a carbonaceous pyropolymer possessing recurring units containing at least hydrogen and carbon atoms in the pore structure of said alumina, continuing the treatment until a total accumulation of said carbonaceous pyropolymer in the pore structure of said alumina is sufficient to result in a replication which possesses a crush strength of from about 0.5 to about 14 kg and recovering the integral shaped carbonaceous pyropolymer replications by leaching said alumina from the carbonaceous pyropolymer by contacting the composite with a dissolving agent comprising phosphoric acid under conditions selected to dissolve substantially all of said alumina.

Another specific embodiment of this invention is found in a method for the preparation of an integral shaped replication which comprises treating alumina with benzene in a reducing atmosphere at a temperature in the range of from about 400° to about 1200° C. to pyrolyze said benzene and form a carbonaceous pyropolymer possessing recurring units containing at least carbon and hydrogen atoms in the pore structure of said alumina, continuing the pyrolyzation until the total accumulation of said carbonaceous pyropolymer in the pore structure of said alumina is sufficient to result in a replication which possesses a crush strength of from about 0.5 to about 2.14 kg, leaching said alumina from said carbonaceous pyropolymer by contacting the composite with phosphoric acid under conditions selected to dissolve substantially all of said alumina, depositing aluminum oxide on each surface of the carbonaceous pyropolymer, removing the carbonaceous pyropolymer by subjecting the composite to oxidation at a temperature in the range of from about 200° to about 800° C. in an atmosphere of air, and recovering the resultant refractory oxide shaped replication.

Other objects and embodiments will be found in the following further detailed description of the invention.

As hereinbefore set forth, the present invention is concerned with integral shaped replication supports, and to a method for preparing these structures. The structures will comprise integral shaped replications of particle aggregates and are prepared by treating an inorganic support of the type hereinafter set forth in greater detail of the desired shape, such as spheres, plates, pellets, rods, fibers, monoliths, etc. with a pyropolymer precursor and thereafter pyropolymerizing said precursor by treatment to an elevated temperature which may range from about 400° to about 1200° C. to form a carbonaceous pyropolymer possessing recurring units containing at least carbon and hydrogen atoms on the surface of said inorganic support. The amount of carbonaceous pyropolymer which is deposited on the surface of the support will be sufficient to duplicate the physical shape and dimensions of the substrate material which acts as the inorganic support as well as a substantial portion of the pore structure thereof. In addition, the carbonaceous pyropolymer which forms the integral shaped replication will possess an Apparent Bulk Density (ABD) which is about 25% to about 100% of the ABD of the substrate material and, in addition, the replicate will possess an average crush strength which may range from about 0.5 up to about 14 kg or more, the crush strength being dependent upon the particular size and shape of the replication. In the preferred embodiment of the present invention, the inorganic support material which acts as a substrate will be characterized as having a surface area of from about 1 to about 500 $m^2/g$ as well as a pore structure which includes both micropores and macropores. For purposes of this invention, micropores will comprise those pores of 300 Å or less diameter, while macropores are those greater than 300 Å in diameter. The pore strength of the shaped replications will substantially duplicate the pore structures of the substrate material, this being especially true of the pore structure as to macropores. In addition, the integral shaped replication will possess the original pore volume of the substrate material and, in addition, the pore volume which was occupied by the substrate will be now available to the integral shaped replication after removal of the substrate material. Illustrative examples of inorganic supports will include refractory oxides such as alumina in various forms, such as gamma-alumina, eta-alumina, theta-alumina, or mixtures of inorganic refractory oxides such as zeolites, silica-alumina, silica-zirconia, zirconia-titania, zirconia-alumina, etc. As hereinbefore set forth, the shape of the inorganic support on the substrate material can be in any form desired. The particular form or shape of the substrate material can be obtained by any method known in the art, such as the marumerizing, pelletizing, nodulizing, etc., whereby a substrate material can be obtained which possesses definite pore size.

In one method of preparing the composite, the inorganic support such as a refractory oxide is heated to a temperature of from about 400° to about 1200° C. in a reducing atmosphere containing an organic pyrolyzable compound. The organic pyropolymer precursors most commonly and preferably used for the purposes of this invention are members of the group consisting of aliphatic hydrocarbons, aliphatic halogen derivatives, aliphatic oxygen derivatives, aliphatic sulfur derivatives, aliphatic nitrogen derivatives, organometallic compounds, alicyclic compounds, aromatic compounds, and heterocyclic compounds. Of the aliphatic hydrocarbons, the more common classes which may be utilized to perform this invention are alkanes, alkenes, alkynes, and alkadienes. Ethane, propane, butane and pentane are among the alkanes which may be successfully used in the performance of this invention. Similarly, alkenes which suffice include ethene, propene, 1-butene, 2-butene and 1-pentene. Alkynes which may be successfully used include ethyne, propyne, 1-butyne, 2-butyne, 1-pentyne, and 1-hexyne. 1,3-Butadiene and isoprene are included among the alkadienes which may be utilized. Among the aliphatic halogen derivatives which suffice for the purposes of this invention are monohaloalkane subgroup, chloromethane, bromoethane, 1-iodopropane, and 1-chlorobutane may be used. Polyhaloalkanes such as carbon tetrachloride, chloroform, 1,2-dichloroethane and 1,2-dichlorobutane may also be utilized. One unsaturated halo compound which may be utilized is chloroprene.

The aliphatic oxygen derivatives appropriate for use in this invention include the classes of alcohols, ethers, halohydrides and alkene oxides, saturated aldehydes and ketones, unsaturated aldehydes and ketones, ketenes, acids, esters, salts and carbohydrates. Various alcohols which may be utilized include ethanol, 2-butanol, 1-propanol, glycol, (e.g. 1,3-propanediol), and glycerol. Ethers utilized include ethyl ether and isopropyl ether. Appropriate halohydrins and alkene oxides include ethylene, chlorohydrin, propylene chlorohydrin, ethylene oxide, and propylene oxide. Suitable saturated aldehydes and ketones include formaldehyde, acetaldehyde, acetone, and ethyl methyl ketone. Unsaturated aldehydes and ketones which may be used include propenol, trans-2-butenal, and butenone. Ketene has also been successfully used as an organic pyrolyzable substance. Likewise, formic acid, acetic acid, oxalic acid, acrylic acid, chloroethanoic acid, formic anhydride and formyl chloride may also be utilized. Ethers such as methyl formate, ethyl formate and ethyl acetate may also be used. Salts such as sodium formate, potassium acetate and calcium propionate may be utilized as may a variety of carbohydrates. The broad classification of aliphatic sulfur derivatives may be broken down into the subclasses of alkanethiols, alkylthioalkanes, sulfonic acids, and alkyl sulfates and alkyl metallic sulfates. Suitable among the alkanethiols are ethyl mercaptan and n-propyl mercaptan. Among the alkylthioalkanes usable are the thioethers, alkyl sulfides, methyl sulfide, ethyl sulfide and methyl propyl sulfide. Ethyl sulfonic acid and n-propyl sulfonic acid are sulfonic acids which may also be successfully used. Ethyl sulfate and sodium laurel sulfate are also appropriate for use.

The broad class of aliphatic nitrogen derivatives may be broken down into the subclasses of nitroalkanes, amides, amines, nitriles and carbylamines. Nitroethane and 1-nitropropane are exemplary of suitable nitroalkanes while acetamide and propioamide are among the appropriate amides. Amines such as dimethylamine and ethylmethylamine, nitriles such as acetonitrile and propionitrile, and carbylamines such as ethyl isocyanide may also be used for the organic pyrolyzable substance of this invention. Organometallic compounds such as tetraisopropyl titanate, tetrabutyl titanate and 2-ethylhexyl titanate may also be used.

Particularly appropriate and preferred for use as the organopyrolyzable substance of this invention are the alicyclic compounds. Foremost among these are cyclohexane and cyclohexene. Aromatic compounds include the subclasses of hydrocarbons, halogen compounds, oxygen derivatives, ethers, aldehydes, ketones, quinones, aromatic acids, aromatic sulfur derivatives, and aromatic nitrogen compounds may also be utilized. Among the many suitable hydrocarbons, benzene, naphthalene, anthracene, and toluene were successfully utilized. Benzyl chloride and benzal chloride are appropriate halogen compounds while phenol, o-cresol, benzyl alcohol and hydroquinone are among the suitable derivatives. Ethers such as anisole and phenetole and aldehydes, ketones, and quinones, such as benzaldehyde, acetophenone, benzophenone, benzoquinone and anthraquinone may also be used. Aromatic acids such as benzoic acid, phenylacetic acid, and hydrocinnamic acid may be utilized while the aromatic sulfur derivative of benzene sulfonic acid will also serve successfully. The aromatic nitrogen compounds of nitrobenzene, 1-nitronaphthalene, aminobenzene and 2-amine toluene may also be successfully used as the organic pyrolyzable substance of this invention. Among the heterocyclic compounds, five member ring compounds such as furan, proline, coumarone, thionaphthene, indole, indigo, and carbazole may be successfully utilized. Six member ring compounds such as pyran, coumarin and acridine may also be utilized.

As can be seen, an extremely wide latitude can be exercised in the selection of the organic pyrolyzable substance, since virtually any organic material that can be vaporized, decomposed and polymerized on the refractory oxide by heating will suffice. The resultant carbonaceous pyropolymer will possess recurring units containing at least carbon and hydrogen atoms; however, depending upon the pyropolymer precursor which has been selected, the pyropolymer may also contain other atoms such as nitrogen, oxygen, sulfur, or metals such as phosphorus etc.

In another embodiment the composite may be prepared by impregnating the refractory inorganic oxide with a solution of a carbohydrate material such as dextrose, sucrose, fructose, starch, etc., and thereafter drying the impregnated support. After drying, the impregnated support is then subjected to pyrolysis temperatures in the range hereinbefore set forth whereby a carbonaceous pyropolymer similar in nature to those hereinbefore described is formed in at least a monolayer on the surface of the refractory inorganic oxide support.

The resulting composite will possess the carbonaceous pyropolymer which possesses recurring units containing at least carbon and hydrogen atoms on the surface of the support in a sufficient quantity whereby the carbonaceous pyropolymer will possess an average crush strength of from about 0.5 to about 14 kilograms, have an ABD of from about 25 to about 100% of the ABD of the support as well as containing from about 15% to 50% of carbon. In addition, the pore structure of the carbonaceous pyropolymer will duplicate a substantial portion of the pore structure, both macropore and micropore in nature, of the substrate material.

Following this, the inorganic support is then chemically leached from the carbonaceous pyropolymer. The leaching is effected by treating said composite with either an acid or a base thereby forming a high surface area carbonaceous pyropolymer support which is a shaped replication of the original inorganic support. The leaching of the base material of the type hereinbefore set forth may be effected over a wide range of temperatures, said range being from about ambient (20°-25° C.) up to about 250° C. or more for a period of time which may range from less than 1 up to about 72 hours or more. It is to be understood that the operating parameters of the leaching step will vary over a wide range and will be dependent upon a combination of time, temperature, strength of the leaching solution, etc. Examples of acids or bases which may be utilized to leach out the base material, that is, the inorganic support such as a refractory inorganic oxide, will include inorganic acids such as phosphoric acid, sulfuric acid, nitric acid, hydrochloric acid, etc., organic acids such as methyl sulfonic acid, ethyl sulfonic acid, propyl sulfonic acid, toluene sulfonic acid, etc., strong bases such as sodium hydroxide, potassium hydroxide, lithium hydroxide, rubidium hydroxide, cesium hydroxide, etc. It is to be understood that the aforementioned leaching materials are only representative of the class of compounds which may be used and that any chemical which is capable of removing the refractory inorganic oxide while retaining the high surface area of the carbonaceous pyropolymer may be used.

As hereinbefore set forth the shaped replication of particle aggregates will possess a high surface area, a desired pore volume, and ABD, as well as possessing a high crush strength thereby enabling the shaped replication comprising a carbonaceous pyropolymer structure to be utilized as a support for catalysts, immobilized enzymes, or even as molecular sieves and adsorbents.

The carbonaceous pyropolymer structure may be used as such or, if so desired, it may then be used as a support upon which at least one inorganic oxide may be deposited. The carbonaceous pyropolymer structures may be impregnated with solutions containing the desired refractory oxide or a combination of refractory oxides. The impregnation of the carbonaceous pyropolymer structures may be effected by treating said structures with either a soluble salt of the desired metal or a sol thereof. For example, the carbonaceous pyropolymer structures may be impregnated with an alumina sol, a zirconium oxide sol, a titanium oxide sol, etc., or mixtures thereof in order to produce a composition of matter comprising a shaped replication of particle aggregates comprising a carbonaceous pyropolymer possessing recurring units containing at least carbon and hydrogen atoms having at least one refractory oxide deposited on all surfaces thereof. The refractory oxides which may be composited on the carbonaceous pyropolymer structure will comprise the oxides of aluminum, boron, cerium, barium, copper, nickel, chromium, molybdenum, zirconium, titanium, hafnium, vanadium, tungsten, magnesium, silicon, tin, lead, etc. As an alternative method of impregnating the carbonaceous pyropolymer structures, it is possible to utilize an aqueous solution of a salt of the desired metal which may then be converted to the corresponding oxide by conventional means such as oxidation. Some representative examples of solution salts or the transition metals which may be used will include metallo-organic salts such as aluminum acetate, aluminum propionate, aluminum succinate, aluminum sulfate, zirconium acetate, zirconium propionate, zirconium succinate, zirconium sulfate, titanium acetate, titanium propionate, titanium succinate, titanium sulfate, silicon acetate, silicon propionate, silicon succinate, silicon sulfate, etc. In addition, it is also contemplated within the scope of this invention that metallo-organic complexes such as aluminum acetylacetonate, silicon acetylacetonate, zirconium acetylacetonate, titanium acetylacetonate, cerium acetylacetonate, barium acetylacetonate, copper acetylacetonate, nickel acetylacetonate, chromium acetylacetonate, molybdenum acetylacetonate, or complexes which are formed between the aforementioned transition metals and ethylene diamine tetraacetic acid may also be used to impregnate the carbonaceous pyropolymer structure, said soluble salts and complexes being subsequently converted to the desired metallic oxide by conventional means such as oxidation at an elevated temperature. It is to be understood that the aforementioned transition metals and salts thereof are only representative of the type of compounds which may be used to impregnate the carbonaceous pyropolymer structure, and that the present invention is not necessarily limited thereto. The resulting support will possess a modified pore structure, said final pore structure being determined by the combination of the pore structure of the starting inorganic support, the properties of the carbonaceous pyropolymer replica structure, the thickness of the impregnated refractory oxide layers, and the fact that all surfaces of the carbonaceous pyropolymer structure are coated with the refractory oxide.

If so desired, the compositions of matter comprising the shaped replication of particle aggregates consisting of a carbonaceous pyropolymer containing recurring carbon and hydrogen atoms having at least one refractory oxide deposited on all surfaces thereof may be utilized as catalysts by having a catalytic metal impregnated either on the refractory oxide or being sealed into the refractory oxide. The addition of the catalytic metal may be effected by utilizing either a co-impregnation, a prior impregnation, or a subsequent impregnation of the carbonaceous pyropolymer structure. Examples of catalytically active metals which may be used will include platinum, palladium, rhodium, ruthenium, germanium, tin, nickel, etc., either alone or in combinations thereof. For example, the impregnation may be effected by treating the carbonaceous pyropolymer structure with an aqueous or organic solution of the desired metal or combination of metals in an amount sufficient to deposit at least one catalytically active metal on the surface of the carbonaceous pyropolymer support in an amount ranging from about 0.1 to about 20% by weight. For example, a mixture of platinum and rhenium, platinum and ruthenium, platinum and tungsten, platinum and nickel, platinum and rhodium, platinum and lead, platinum and germanium, palladium and rhenium, palladium and rhodium, palladium and tungsten, palladium and nickel, palladium and ruthenium, palladium and lead, palladium and germanium, etc., may be impregnated on the carbonaceous pyropolymer support. The solution which is utilized to impregnate the carbonaceous pyropolymer structure is preferably aqueous in nature, some specific examples of these aqueous solutions being chloroplatinic acid, chloroplatinous acid, bromoplatinic acid, sodium platinate, potassium platinate, lithium platinate, platinic chloride, platinous chloride, as well as corresponding solutions of palladium, ruthenium, tin, tungsten, germanium, rhodium, and mixtures thereof, etc. After impregnation of the structure, the solvent is removed by heating to a temperature in the range of from about 100° to about 400° C., the temperature being that which is sufficient to evaporate said solvent and leave the metal or mixtures of metals impregnated on the surface of the carbonaceous pyropolymer structure. Thereafter the structure may then be dried at elevated temperatures ranging from about 100° to about 200° C. for a period of time ranging from about 2 to about 6 hours or more. Thereafter, the metal impregnated carbonaceous pyropolymer structure is then subjected to a reducing step in the presence of a reducing atmosphere or medium such as hydrogen at elevated temperatures of from about 200° to about 600° C. or more for a period of time ranging from about 0.5 to 4 hours or more whereby the metallic compound is reduced to the metal in the form of particles. By utilizing a metallic impregnation prior to impregnating the carbonaceous pyropolymer support with a solution or sol of a refractory oxide, the catalytically active metal will be sealed into the refractory oxide. Conversely speaking, the metal impregnation step herein described may be effected using a co-impregnation technique or subsequently impregnating the composition of matter in which the carbonaceous pyropolymer structure contains at least one refractory inorganic oxide on all surfaces thereof, thereby having the catalytically active metals impregnated on the surface of the refractory oxide.

If so desired, it is also contemplated within the scope of this invention that following the deposition of at least one refractory oxide on all surfaces of the carbonaceous pyropolymer structure either with or without the presence of a catalytically active metal, the aforesaid carbonaceous pyropolymer structure may be removed thus leaving a refractory oxide or mixture of refractory oxides which are shaped replications of the carbonaceous pyropolymer structure but which will possess a surface area which may be up to several times the surface area of the orginal inorganic support. The removal of the carbonaceous pyropolymer structure is accomplished by treating the shaped replication composition of matter at an elevated temperature in the presence of an oxidizing agent such as an oxygen-containing gas. The treatment of the composition of matter with the oxidizing agent may be effected with an oxygen-containing gas at elevated temperatures ranging from about 200° to about 800° C. with the concentration of the oxygen in the atmosphere ranging from about 0.1 to about 21%. The removal of the carbonaceous pyropolymer structure may also be effected over a period of time ranging from less than 1 to about 10 hours or more in duration, the operating parameters of temperature, time, and oxygen content being dependent upon the thickness and extent of graphitization of the carbonaceous pyropolymer structure as well as the physical and chemical properties thereof. For example, one method of effecting the removal of the structure is to treat the composition of matter at a temperature of 200° C. for a predetermined period of time and thereafter increasing the temperature at a predetermined rate until the upper portion of the operating range has been reached and maintaining the temperature at this point for a period of time sufficient to remove all of the aforesaid carbonaceous pyropolymer structure. Thereafter the refractory oxide or mixture of refractory oxide shaped replication may be used as a catalyst support, molecular sieve, absorbent, etc., or if said replication contains a catalytically active metal such as those hereinbefore set forth, it may be used as a catalyst per se.

The shaped replications may be prepared in any suitable manner including both batch and continuous types of operations. For example, when a batch type of operation is employed an inorganic support such as an alumina of the type hereinbefore set forth in greater detail may be dried and placed in a reducing atmosphere. Following this, the pyropolymer precursor also in a reducing atmosphere is passed over the inorganic oxide support at an elevated temperature of from about 400° to about 1200° C. for a period of time sufficient to pyropolymerize the precursor while impregnating the support. Alternatively, the inorganic support such as a refractory oxide may be impregnated with an aqueous solution of a carbohydrate such as sucrose or dextrose, drying the impregnated base at an elevated temperature, and thereafter pyrolyzing the dried impregnated base at a temperature in the range hereinbefore set forth for a predetermined period of time sufficient to form at least a monolayer of the carbonaceous pyropolymer on the base. After recovering the inorganic support containing at least a monolayer of a carbonaceous pyropolymer containing recurring carbon and hydrogen atoms, the composite is then subjected to a leaching step. It is to be understood within the scope of this invention that the carbonaceous pyropolymer may vary in thickness ranging from one to several monolayers by varying the amount of carbonaceous pyropolymer precusor used to impregnate the base as well as by utilizing various operating parameters of time and temperature. The composite is then leached in an appropriate apparatus by immersion in an acid such as a 96% phosphoric acid solution at an elevated temperature which may range from about 50° up to about 150° C. or more for a predetermined period of time. Following the leach step the shaped replication of particle aggregates comprising the carbonaceous pyropolymer is received, washed and dried.

After recovery of the carbonaceous pyropolymer structure, if so desired, it may then be reimpregnated with an inorganic refractory oxide or mixture of inorganic refractory oxides which are either in sol or soluble salt form to effect a deposition of the refractory inorganic oxide or mixture thereof on all surfaces of the carbonaceous pyropolymer structure. In the event that the refractory oxides are in the form of soluble salts, the resulting composition of matter is then subjected to treatment at an elevated temperature in order to convert the salts to the corresponding oxides, said conversion being accomplished by any means known in the art such as heat treatment, oxidation, etc. The resulting composition of matter in which the carbonaceous pyropolymer structure is now coated with a refractory oxide on all surfaces will, in itself, also comprise a shaped replication of the starting inorganic base support but will possess an altered pore structure, the final pore structure being determind by a combination of various factors including the pore structure and size of the original base material, the properties of the carbonaceous pyropolymer structure, the thickness of said carbonaceous pyropolymer structure, and the thickness of the impregnated refractory oxide coating. In many instances, the surface area of the original starting support normally will be increased, inasmuch as both sides of the carbonaceous pyropolymer structure are now coated with the refractory oxide.

The aforementioned compositon of matter comprising a shaped replication of particle aggregates which consist of carbonaceous pyropolymer containing recurring carbon and hydrogen atoms in which all surfaces thereof are coated with at least one refractory oxide may then be subjected to an oxidation treatment at an elevated temperature in the presence of an oxygen-containing gas whereby the carbonaceous pyropolymer structure is removed, thus leaving a shaped replication consisting of the refractory oxide or mixture of refractory oxides which was coated on the surface of the carbonaceous pyropolymer support.

In another embodiment of the invention, the shaped replication of particle aggregates having all surfaces thereof coated by at least one refractory oxide may also be impregnated with an aqeous solution of a catalytically active metal, said impregnation being effected prior to the impregnation with the refractory oxide, co-impregnated with the refractory oxide or impregnated at a period of time subsequent to the refractory oxide impregnation. The impregnation of the carbonaceous pyropolymer structure with an aqueous solution of a catalytically active metal is effected by placing the carbonaceous pyropolymer structure in an aqueous solution, allowing the impregnation to take place over a period of time which may range from about 0.5 up to about 10 hours or more, and after recovering the impregnated structure drying the same at a temperature of about 100° C. for a period of time sufficient to remove the water. Following the drying the impregnated structure is then subjected to a reducing treatment with hydrogen at a temperature in the range of from about 250° to about 400° C. for a period of time which may range from about 1 to about 4 hours whereby the metallic portion of the impregnating solution is reduced to the elemental metal. It is also contemplated within the scope of this invention that any other metal of applying a catalytically active metal to the surface of the inorganic oxide may be employed if so desired.

In addition to the batch type of operation hereinbefore discussed, the shaped replication supports may also be prepared in a continuous manner of operation. For example, when such a type of operation is to be employed an inorganic support, preferably possessing a high surface area, is continuously passed through a pyrolysis zone wherein it is contacted with a pyropolymer precursor at an elevated temperature in the range of from about 400° to about 1200° C. whereby a carbonaceous pyropolymer containing recurring carbon and hydrogen atoms is deposited on the surface of said support. By varying operating parameters of time, temperature and particular pyropolymer precursor, the thickness of the carbonaceous pyropolymer on the surface of the inorganic support can be adjusted to a predetermined size. After the predetermined depth of the carbonaceous pyropolymer on the surface inorganic support has been attained, it is recovered from the pyrolysis zone and continuously charged to a leaching bath. In the leaching bath the inorganic support is leached from the composite utilizing an acid such as phosphoric acid or a strong base such as sodium hydroxide in an appropriate strength at elevated temperatures within the range hereinbefore set forth. Upon completion of the leach the carbonaceous pyropolymer structure which is a shaped replication of the original inorganic support is continuously withdrawn from said bath and, in one embodiment of the invention, continuously charged to either a sol or a solution of a transition metal salt wherein the carbonaceous pyropolymer support is coated with a salt of at least one refractory metal oxide, all surfaces of the carbonaceous pyropolymer structure being coated. Again, as in the case of the pyrolysis step of the process, the thickness of one refractory oxide or a mixture of refractory oxides may be varied by predetermining the operating parameters of time and solution strength of the soluble salt of the transition metal. After passage through the bath or sol, the composition of matter comprising a shaped replication of particle aggregates consisting of a carbonaceous pyropolymer having at least one refractory oxide deposited on all surfaces thereof is continuously withdrawn and passed to a drying over wherein the solvent such as water is removed. Thereafter, if desired, the composition of matter may be recovered and used as a catalyst base, adsorbent, molecular sieve, etc., or it may be continuously passed to an oxidation zone wherein the composition of matter is subjected to an oxidation step in the presence of an oxidizing agent such as water or an oxygen-containing gas such as air or oxygen at an elevated temperature in the range of from about 200° to about 800° C. whereby the carbonaceous pyropolymer structure is removed, thus leaving a shaped replication of the refractory metal oxide or mixture of refractory metal oxides possessing essentially the same shape as the original inorganic support but also possessing a surface area several times that of the original support.

In another embodiment of the invention, after formation of the carbonaceous pyropolymer structure by leaching out the inorganic support the structure may then be impregnated with a catalytically active metal by continuous passage through an aqueous solution of such metal prior to passage through the solution or sol wherein at least on refractory oxide is deposited on the surface of said support. Another variation of the invention consists in passing the refractory oxide coated carbonaceous pyropolymer support through an impregnating solution of the catalytically active metal and thereafter drying the impregnated composition of matter. In both instances with utilizing a preimpregnation or a post-impregnation with the catalytically active metal, the composite is continuously passed through a reducing zone wherein the impregnated composite is contacted with hydrogen at an elevated temperature to reduce the catalytically active metal to the elemental form.

By utilizing the various steps hereinbefore set forth, it is possible to obtain novel compositions of matter which possess the desirable physical characteristics of crushing strength, pore volume, pore size, etc., which may be utilized as a catalyst support, molecular sieve, absorbent, etc., for many chemical reactions of the type previously mentioned.

The following examples are given for purposes of illustrating the novel compositions of matter and processes for obtaining the same. However, it is to be understood that these examples are given merely for purposes of illustration and that the present invention is not necessarily limited thereto.

EXAMPLE I

A shaped replication support was prepared by calcining ⅛" diameter alumina spheres having a surface area of 147 m²/g, a pore volume of 0.42 mg/liter and an ABD of 0.377 g/ml at a temperature of 482° C. for a period of 2 hours. Following this the spheres were placed in an inert atmosphere and a carbonaceous pyropolymer layer was deposited on these spheres by pyrolyzing cyclohexane in the presence of said spheres at a temperature of 788° C. in an inert atmosphere.

The resulting composite material was then leached by immersion in a 96% phosphoric acid solution at a temperature of 160° C. for a period of 24 hours. The resulting shaped replication of particle aggregates comprising a carbonaceous pyropolymer structure possessing recurring units of carbon and hydrogen atoms was analyzed and it was found that the alumina content was only 0.27 wt. %, thus indicating that essentially all of the alumina had been removed in the leach. The carbonaceous pyropolymer structure in the form of spheres were found to have a BET surface area of 656 m²/g, an ABD of 0.17 g/ml and a crushing strength of 7 kg. To further illustrate the differences between the initial inorganic support and the shaped replication in the form of a carbonaceous pyropolymer structure, the shape of which was a replication of the shape of the initial inorganic refractory inorganic oxide support, the characteristics are set forth in the following table.

|  | Feed | Product |
| --- | --- | --- |
| Composition | Alumina | Carbonaceous Pyropolymer |
| Bulk Density | 0.38 g/ml | 0.17 g/ml |
| Size | ⅛" Spheres | ⅛" Spheres |
| Pore Volume, <600 Å | 1.10 ml/g | 1.84 ml/g |
| Pore Volume, >600 Å | 0.17 ml/g | 1.26 ml/g |
| Pore Volume/Bed Volume |  |  |
| <600 Å | 0.42 ml/ml | 0.31 ml/ml |
| >600 Å | 0.07 ml/ml | 0.21 ml/ml |
| Total | 0.49 | 0.52 |
| Surface Area, M²/G | 147 m²/g | 656 m²/g |
| Surface Area/Bed Volume | 55.9 m²/ml | 111.5 m²/ml |
| Volume or Solid/Bed Volume | 0.12 ml/ml | 0.074 ml/ml |

It is therefore readily apparent from the above table that the shaped replication of particle aggregates which comprised a carbonaceous pyropolymer containing at least recurring carbon and hydrogen atoms possessed a bulk density approximately ½ of the bulk density of the original support, was of the same size, had an increased pore volume and a surface area which was approximately 4.5 times greater than that of the original support. The increased surface area thus renders the support of greater value for the deposition of catalytically active metals for further use as a catalyst in various hydrocarbon reactions.

EXAMPLE II

The shaped replication of particle aggregates comprising a carbonaceous pyropolymer possessing recurring units of carbon and hydrogen atoms which was prepared according to the above example was then impregnated with a refractory oxide. The impregnation was effected by heating the shaped replication under vacuum at a temperature of about 100° C. to drive off adsorbed water. After allowing the particle aggregates to cool, the particle aggregates which were in the form of spheres were subjected to multiple impregnations with a 100% solution of titanium-2-propoxide under vacuum. After allowing the impregnation to occur for a period of about 2 hours, the excess solution was drained and the spheres were washed with 2-propanol under a nitrogen atmosphere. After washing with the 2-propanol, the spheres were then washed in air and subjected to hydrolysis to form a composition of matter comprising a shaped replication of particle aggregates comprising a carbonaceous pyropolymer possessing recurring units of carbon and hydrogen atoms having a titanium dioxide coating deposited on the surface thereof.

EXAMPLE III

The titanium dioxide coated spheres which were prepared according to the above paragraph were then subjected to an oxidation procedure in which the spheres were heated in an oxygen containing atmosphere at a temperature of from about 540° to about 750° C. for a period of about 8 hours. At the end of this period the spheres were recovered and analyzed for crystal structure. The titanium dioxide spheres were found to comprise a mixture of anatase and rutile, no titanium, titanium carbide, or carbon being found by this analysis. It is therefore apparent that by utilizing the process of this invention it is possible to obtain a shaped replication of an initial support, said shaped replication comprising either particle aggregates consisting of carbonaceous pyropolymer possessing recurring units of carbon and hydrogen atoms depending upon the pyropolymer precursor which is employed; a refractory oxide coated shaped replication of particle aggregates, the thickness of the refractory oxide being dependent upon the particular refractory oxide which is employed as well as the number of impregnations; or a shaped replication of a refractory oxide alone, the carbonaceous pyropolymer having been removed by conventional oxidation treatments.

We claim as our invention:

1. A method for the preparation of an integral shaped replication in the form of a sphere, plate or pellet of a shaped, porous and dissolvable substrate material which possesses physical dimensions, shape, in the form of a sphere, plate or pellet, and an ABD suitable for use as an adsorbent in a fixed bed adsorption process, said replication duplicating said physical shape and dimension of said substrate material and a substantial portion of the pore structure thereof, which replication consists essentially of a carbonaceous pyropolymer possessing recurring units containing at least carbon and hydrogen atoms and which replication has an ABD which is about 25% to about 100% of the ABD of said substrate material, which comprises the steps of:
   (a) treating said substrate material in the form of a sphere, plate or pellet with an organic pyrolyzable precursor compound in a reducing atmosphere at a temperature in the range of from about 400° to about 1200° C. to pyrolyze said organic compound to form said carbonaceous pyropolymer possessing recurring units containing at least carbon and hydrogen atoms in the pore structure of said substrate material,
   (b) continuing the treatment of step (a) until the total accumulation of said carbonaceous pyropolymer in the pore structure of said substrate is sufficient to result in a replication which possesses a crush strength of from about 0.5 to about 14 kg, and
   (c) recovering the integral shaped replication in the form of a sphere, plate or pellet comprising a carbonaceous pyropolymer possessing recurring units containing at least carbon and hydrogen atoms by leaching said substrate material from the product of step (b) by contacting said product with a dissolving agent for said substrate material under conditions selected to dissolve substantially all of said substrate material.

2. The method as set forth in claim 1 in which said substrate material is a high-surface area inorganic oxide.

3. The method as set forth in claim 2 in which said inorganic oxide is an alumina.

4. The method as set forth in claim 2 in which said inorganic oxide is silica.

5. The method as set forth in claim 1 in which said carbonaceous pyropolymer precursor compound is benzene.

6. The method as set forth in claim 1 in which said carbonaceous pyropolymer precursor compound is cyclohexane.

7. The method as set forth in claim 1 in which said carbonaceous pyropolymer precursor compound is dextrose.

8. The method as set forth in claim 1 in which said dissolving agent is phosphoric acid.

9. The method as set forth in claim 1 in which said dissolving agent is sulfuric acid.

10. The integral shaped replication formed in the shape of a sphere, plate or pellet according to the method set forth in claim 1.

11. The replication set forth in claim 10 in which said substrate is an alumina.

12. The replication set forth in claim 10 in which said substrate is a silica.

13. The method as set forth in claim 1 further characterized in that at least one refractory oxide is deposited on each surface of said integral shaped replication.

14. The process as set forth in claim 13 in which the refractory oxide is alumina.

15. The process as set forth in claim 13 in which the refractory oxide is silica.

16. The process as set forth in claim 13 in which the refractory oxide is titanium oxide.

17. The process as set forth in claim 13 in which the refractory oxide is zirconium oxide.

18. The process as set forth in claim 13 in which the refractory oxide is a mixture of alumina and zirconium oxide.

19. An integral shaped replication formed by the method set forth in claim 17.

20. The integral shaped replication set forth in claim 19 further characterized in that said replication contains at least one catalytically active metal deposited on the surface of said refractory oxide.

21. The replication set forth in claim 19 in which said catalytically active metal is platinum.

22. The replication as set forth in claim 19 in which said catalytically active metal is palladium.

23. The replication as set forth in claim 19 in which said catalytically active metal is rhodium.

24. A method for the preparation of an integral shaped replication in the form of a sphere, plate or pellet of a shaped, porous and dissolvable substrate material which possesses physical dimensions, shape in the form of a sphere, plate or pellet and an ABD suitable for use as an adsorbent in a fixed bed adsorption process, said replication duplicating said physical shape and dimensions of said substrate material and a substantial portion of the pore structure thereof, which replication consists essentially of a carbonaceous pyropolymer possessing recurring units containing at least carbon and hydrogen atoms and which replication has an ABD which is about 25% to about 100% of the ABD of said substrate material, which comprises the steps of:
   (a) treating said substrate material in the form of a sphere, plate or pellet with an organic pyrolyzable precursor compound in a reducing atmosphere at a temperature in the range of from about 400° to about 1200° C. to pyrolyze said organic compound to form said carbonaceous pyropolymer possessing recurring units containing at least carbon and hydrogen atoms in the pore structure of said substrate material;
   (b) continuing the treatment of step (a) until the total accumulation of said carbonaceous pyropolymer in the pore structure of said substrate is sufficient to result in a replication which possesses a crush strength of from about 0.5 to about 14 kg;

(c) recovering the integral shaped replication in the form of a sphere, plate or pellet comprising a carbonaceous pyropolymer possessing recurring units containing at least carbon and hydrogen atoms by leaching said substrate material from the product of step (b) by contacting said product with a dissolving agent for said substrate material under conditions selected to dissolve substantially all of said substrate material;

(d) depositing at least one refractory oxide on each surface of said integral shaped replication in the form of a sphere, plate or pellet comprising a carbonaceous pyropolymer possessing recurring units containing at least carbon and hydrogen atoms;

(e) removing said carbonaceous pyropolymer possessing recurring units by oxidation; and (f) recovering resultant refractory oxide shaped replications.

25. The process as set forth in claim 24 in which said oxidation is effected at a temperature in the range of from about 200° to about 800° C.

26. The process as set forth in claim 24 in which said oxidation is effected in the presence of an oxygen containing gas.

27. The process as set forth in claim 26 in which said oxygen containing gas is air.

28. The process as set forth in claim 26 in which said oxygen containing gas is oxygen.

29. The integral refractory oxide shaped replication formed by the method set forth in claim 24.

* * * * *